(12) United States Patent
Shi et al.

(10) Patent No.: US 11,101,515 B2
(45) Date of Patent: *Aug. 24, 2021

(54) BATTERY PACK AND VEHICLE

(71) Applicant: CONTEMPORARY AMPEREX TECHNOLOGY CO., LIMITED, Ningde (CN)

(72) Inventors: Dongyang Shi, Ningde (CN); Haizu Jin, Ningde (CN); Rui Yang, Ningde (CN); Fei Hu, Ningde (CN); Peng Wang, Ningde (CN); Yuqun Zeng, Ningde (CN); Yongshou Lin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/137,122

(22) Filed: Dec. 29, 2020

(65) Prior Publication Data

US 2021/0119290 A1     Apr. 22, 2021

Related U.S. Application Data

(63) Continuation of application No. 16/691,234, filed on Nov. 21, 2019.

(30) Foreign Application Priority Data

May 7, 2019 (CN) .......................... 201910375558.0

(51) Int. Cl.
*H01M 6/46* (2006.01)
*H01M 50/183* (2021.01)
(Continued)

(52) U.S. Cl.
CPC .......... *H01M 50/183* (2021.01); *H01M 50/10* (2021.01); *H01M 50/20* (2021.01); *H01M 2220/20* (2013.01)

(58) Field of Classification Search
CPC .... H01M 50/183; H01M 50/10; H01M 50/20; H01M 2220/20
See application file for complete search history.

(56) References Cited

U.S. PATENT DOCUMENTS

2014/0065472 A1* 3/2014 Naritomi ............. H01M 50/155
429/175

FOREIGN PATENT DOCUMENTS

CN   105762316 A      7/2016
EP   3264492 A1 *    1/2018 .......... H01M 10/653
(Continued)

OTHER PUBLICATIONS

Contemporary Amperex Technology Co., Limited, Extended European Search Report, EP 19210860.3, dated May 14, 2020, 7 pgs.

*Primary Examiner* — Jane J Rhee
(74) *Attorney, Agent, or Firm* — Morgan, Lewis & Bockius LLP

(57) ABSTRACT

The present disclosure provides a battery pack and a vehicle. The battery pack comprises a battery module, a box assembly and a first adhesive member. The battery module comprises first batteries arranged sequentially in a horizontal direction. The first battery comprises an electrode assembly and a case, and the electrode assembly is received in the case. The electrode assembly comprises a first electrode plate, a second electrode plate and a separator. The box assembly has a connection portion, and the connection portion is positioned at a side of the battery module in the vertical direction. An outer surface of the case comprises a first surface, and the first surface is connected with the connection portion via the first adhesive member. An area A (Continued)

of the first surface and an elastic modulus B of the first adhesive member satisfy a relationship: $0.02 \text{ cm}^2/\text{MPa} \leq A/B \leq 9 \text{ cm}^2/\text{MPa}$.

19 Claims, 5 Drawing Sheets

(51) Int. Cl.
*H01M 50/10* (2021.01)
*H01M 50/20* (2021.01)

(56) References Cited

FOREIGN PATENT DOCUMENTS

| EP | 3055898 B1 | 12/2018 |
| EP | 3460867 A1 | 3/2019 |
| WO | WO-2018026105 A1 | 2/2018 |
| WO | WO-2019013508 A1 | 1/2019 |

* cited by examiner

BATTERY PACK AND VEHICLE

CROSS-REFERENCE To RELATED APPLICATIONS

This application is a continuation application of U.S. patent application Ser. No. 16/691,234, filed on Nov. 21, 2019, which claims priority to Chinese Patent Application No. 201910375558.0, filed with the State Intellectual Property Office of the People's Republic of China on May 7, 2019, all of which are incorporated herein by reference in their entirety.

TECHNICAL FIELD

The present disclosure relates to the field of battery, and particularly relates to a battery pack and a vehicle.

BACKGROUND

A secondary battery has the advantages of high energy density, long working life, energy saving, environmental protection and the like, and has been widely applied to various fields, such as new energy vehicle, energy storage power station and the like.

A battery pack generally comprises a box assembly and a battery module accommodated in the box assembly; the battery module comprises batteries arranged sequentially. In known technology, the battery module fixes the batteries by providing an end plate and a side plate, the end plate is fixed to the box assembly via a bolt, and the batteries of the battery module are not directly connected with the box assembly, so the overall stiffness of the battery module is low. When the battery module vibrates, the battery positioned at middle of the battery module cannot be easily fixed completely due to insufficient clamping force, thereby resulting in safety risk.

SUMMARY

In view of the problem existing in the background, an object of the present disclosure is to provide a battery pack and a vehicle, which can ensure dynamics performance of the battery and connecting strength between the battery and the box assembly.

In order to achieve the above object, the present disclosure provides a battery pack and a vehicle.

The battery pack comprises a battery module, a box assembly and a first adhesive member. The box assembly has an accommodating cavity, the battery module is positioned in the accommodating cavity of the box assembly. The battery module comprises first batteries arranged sequentially in a horizontal direction. The first battery comprises an electrode assembly and a case, and the electrode assembly is received in the case. The electrode assembly comprises a first electrode plate, a second electrode plate and a separator provided between the first electrode plate and the second electrode plate. The electrode assembly is a winding structure and in a flat shape, and the electrode assembly comprises two flat surfaces, the two flat surfaces face each other in a vertical direction; or, the electrode assembly is a stacking structure, the first electrode plate, the separator and the second electrode plate are stacked in the vertical direction. The box assembly has a connection portion, and the connection portion is positioned at a side of the battery module in the vertical direction. An outer surface of the case comprises a first surface, and the first surface is connected with the connection portion via the first adhesive member.

An area A of the first surface and an elastic modulus B of the first adhesive member satisfy a relationship: $0.02 \text{ cm}^2/\text{MPa} \leq A/B \leq 9 \text{ cm}^2/\text{MPa}$.

The area A of the first surface and the elastic modulus B of the first adhesive member satisfy a relationship: $0.06 \text{ cm}^2/\text{MPa} \leq A/B \leq 4 \text{ cm}^2/\text{MPa}$.

The area A of the first surface is $50 \text{ cm}^2\text{-}600 \text{ cm}^2$, the elastic modulus B of the first adhesive member is 150 MPa-800 MPa.

The elastic modulus B of the first adhesive member and a thickness C of the first adhesive member satisfy a relationship: $2 \text{ MPa·cm} \leq B \cdot C \leq 500 \text{ MPa·cm}$.

The thickness C of the first adhesive member is 0.05 cm-0.5 cm.

The first adhesive member is an adhesive, and the adhesive is one or more selected from a group consisting of epoxy resin, polyurethane and acrylic resin.

A dimension of the battery module in the horizontal direction is larger than a dimension of the battery module in the vertical direction.

A contacting area between the first adhesive member and the first surface is defined as S1, a total area of the outer surface of the case is defined as S2, a value of S1/S2 is larger than 6%.

The case further comprises a second surface and two third surfaces, the first surface and the second surface face each other in the vertical direction, and the two third surfaces face each other in the horizontal direction. Both of the area of the first surface and an area of the second surface are larger than an area of the third surface.

The battery module further comprises second batteries arranged sequentially in the horizontal direction, the second battery and the first battery are stacked in the vertical direction, and the second battery is positioned at a side of the first battery close to the second surface. The battery pack further comprises a second adhesive member, and the second adhesive member connects the second surface and the second battery.

The case comprises an insulation layer and a base, the insulation layer is positioned at an outer side of the base and contacted with the first adhesive member.

The box assembly comprises an upper box cover and a lower box body, the upper box cover and the lower box body are connected. The connection portion is a bottom wall of the lower box body, the first adhesive member is provided to the bottom wall of the lower box body, and the first surface is connected with the bottom wall of the lower box body via the first adhesive member; or, the connection portion is a top wall of the upper box cover, the first adhesive member is provided to the top wall of the upper box cover, and the first surface is connected with the top wall of the upper box cover via the first adhesive member.

The box assembly comprises an upper box cover, a lower box body and a fixing plate, the upper box cover and the lower box body are connected, the connection portion is the fixing plate. The fixing plate is positioned at an upper side of the battery module in the vertical direction and connected with the upper box cover, the first adhesive member is provided on the fixing plate, and the first surface is connected with the fixing plate via the first adhesive member; or, the fixing plate is positioned at a lower side of the battery module in the vertical direction and connected with the lower box body, the first adhesive member is provided on the fixing plate, and the first surface is connected with the fixing plate via the first adhesive member.

The vehicle comprises a vehicle body and the battery pack, the battery pack is positioned to the vehicle body. In some embodiments, the battery pack is horizontally provided to a bottom of the vehicle body.

The present disclosure has the following beneficial effects: in the present disclosure, the first batteries are fixed to the box assembly via the first adhesive member, thereby increasing the connecting strength between the battery module and the box assembly, achieving the fixation of the first batteries, and reducing the safety risk when the battery pack vibrates. In the present disclosure, the area A of the first surface and the elastic modulus B of the first adhesive member are comprehensively considered, when "0.02 $cm^2$/MPa≤A/B≤9 $cm^2$/MPa" is satisfied, it can ensure the dynamics performance of the first battery and the connecting strength between the first battery and the box assembly.

Figure 1:
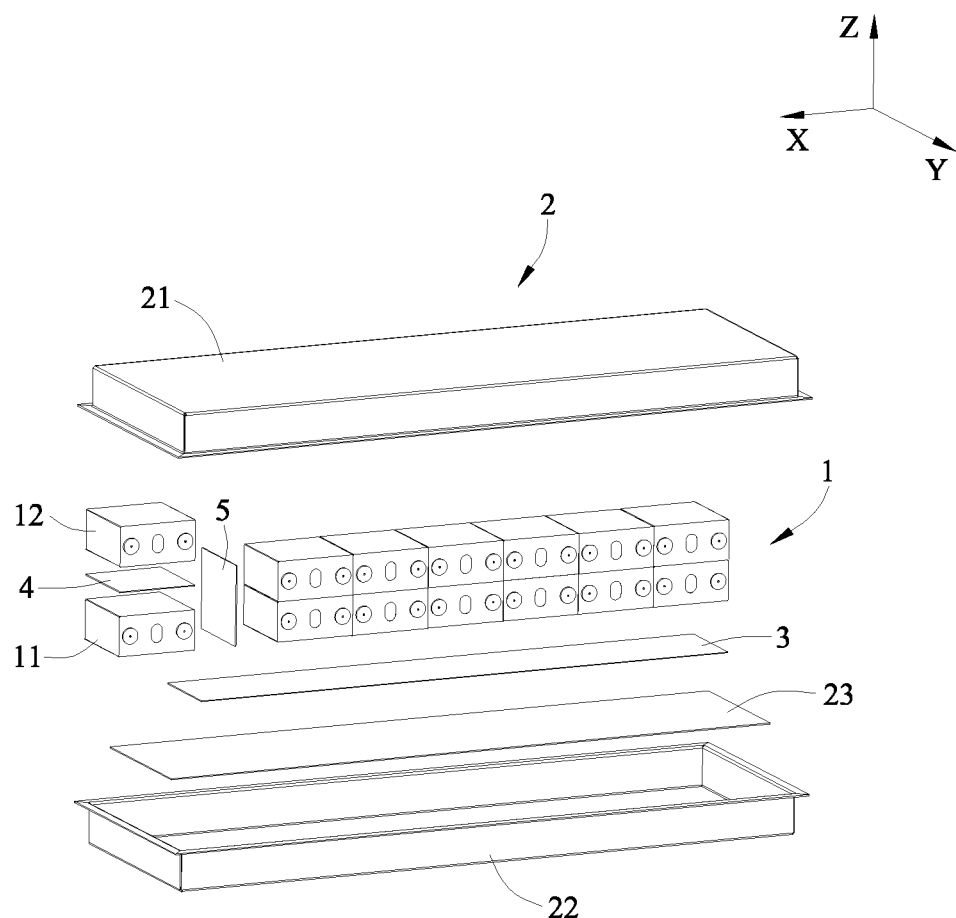
FIG. 1 is an exploded view of a battery pack according to the present disclosure.

Reference numerals in figures are represented as follows:
1 battery module
  11 first battery
    111 electrode assembly
      111a first electrode plate
      111b second electrode plate
      111c separator
      111d flat surface
      111e narrow surface
    112 case
      112a first surface
      112b second surface
      112c third surface
      112d fourth surface
    113 cap assembly
      113a cap plate
      113b electrode terminal
  12 second battery
2 box assembly
  21 upper box cover
  22 lower box body
  23 fixing plate
3 first adhesive member
4 second adhesive member
5 third adhesive member
6 jig
7 detector
8 metal plate
X length direction
Y width direction
Z vertical direction

DETAILED DESCRIPTION

To make the object, technical solutions and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second", "third", and "fourth" are only used for illustrative purposes and are not to be construed as expressing or implying a relative importance. The term "plurality" is two or more. Unless otherwise defined or described, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present disclosure will be further described in detail in combination with the exemplary embodiments and the figures.

In the description of the present disclosure, in the figures, the directions indicated by arrows X are length directions, the directions indicated by arrows Y are width directions, and the directions indicated by arrows Z are vertical directions. A horizontal direction is a direction parallel to a horizontal plane, and the horizontal direction is either a length direction X or a width direction Y. In addition, the horizontal direction not only includes a direction absolutely parallel to the horizontal plane, but also a direction substantially parallel to the horizontal plane conventionally cognized in engineering. The vertical direction is a direction perpendicular to the horizontal plane, the vertical direction not only includes a direction absolutely perpendicular to the horizontal plane, but also a direction substantially perpendicular to the horizontal plane conventionally cognized in engineering. Furthermore, spatially relative terms, such as "above", "below", "top", "bottom" and the like, described in the present disclosure, are understood relative to the vertical direction Z.

The present disclosure provides a vehicle, the vehicle comprises a vehicle body and a battery pack, the battery pack is provided to the vehicle body. The vehicle is a new energy vehicle, for example, the vehicle may be a pure electric vehicle, hybrid power vehicle or extended range vehicle. The vehicle body is provided with a drive motor, the drive motor is electrically connected with the battery pack, the battery pack supplies electric energy, and the drive motor is connected with a wheel on the vehicle body via a transmission mechanism, thereby driving the vehicle. Preferably, the battery pack may be horizontally provided to a bottom of the vehicle body.

FIG. 1 is an exploded view of a battery pack according to the present disclosure. The battery pack comprises a battery module 1, a box assembly 2 and a first adhesive member 3.

The box assembly 2 comprises an upper box cover 21 and a lower box body 22. In FIG. 1, the upper box cover 21 and the lower box body 22 are separated. The upper box cover 21 and the lower box body 22 are connected together in sealing, and an accommodating cavity is formed between the upper box cover 21 and the lower box body 22. The upper box cover 21 and the lower box body 22 may be made of aluminum, aluminum alloy or other metal.

The battery module 1 is accommodated in the accommodating cavity of the box assembly 2. The battery module 1 may be provided as one or plurality in number. When the battery module 1 is provided as plurality in number, the plurality of the battery modules 1 may be arranged in the length direction X or arranged in the width direction Y. The battery module 1 comprises first batteries 11 arranged sequentially in the horizontal direction. The first batteries 11 are secondary batteries which can charge and discharge repeatedly. The first batteries 11 may be electrically connected via busbars.

The battery module 1 further comprises two end plates not shown in the figures and a strap not shown in the figures. The two end plates are respectively provided at two ends of the first batteries 11 in the horizontal direction, the strap encircles the first batteries 11 and the two end plates. The end plate may be made of metal material, such as aluminum, aluminum alloy or the like, or made from insulation material.

Figure 2:
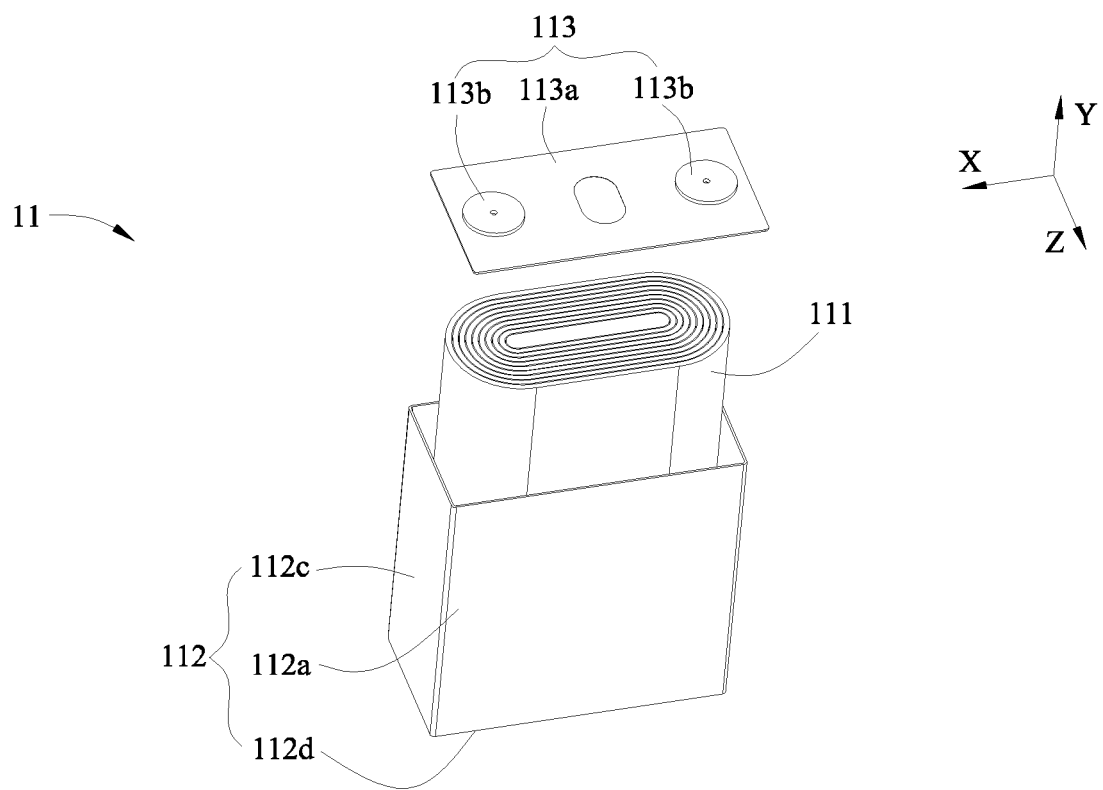
FIG. 2 is a schematic view of an embodiment of a first battery of the battery pack according to the present disclosure.

Referring to FIG. 2, the first battery 11 comprises an electrode assembly 111, a case 112 and a cap assembly 113. The electrode assembly 111 is received in the case 112, and the electrode assembly 111 comprises a first electrode plate 111a, a second electrode plate 111b and a separator 111c provided between the first electrode plate 111a and the second electrode plate 111b.

The case 112 may be made of metal material or composite material. For example, in an embodiment, the case 112 is integrally made of metal material, such as aluminum, aluminum alloy, nickel-plated steel or the like. Alternatively, in another embodiment, the case 112 may comprises a base and an insulation layer, the base is made of metal material, such as aluminum, aluminum alloy, nickel-plated steel or the like, the insulation layer is provided to an outer surface of the base by coating, bonding or the like; at this time, the base made of metal material can ensure the strength of the case 112, and the insulation layer can promote the insulating performance of the case 112.

The case 112 may have a hexahedron shape or other shape. The case 112 has an opening, and the electrode assembly 111 can be placed into the case 112 via the opening. In an embodiment, the opening is positioned at an end of the case 112 in the width direction Y.

The cap assembly 113 comprises a cap plate 113a and an electrode terminal 113b, the electrode terminal 113b is provided to the cap plate 113a. The cap plate 113a may be made of metal material, such as aluminum, aluminum alloy or the like, a dimension of the cap plate 113a is matched with a dimension of the opening of the case 112. The cap plate 113a is connected to the case 112 by welding and covers the opening of the case 112, thereby sealing the electrode assembly 111 in the case 112.

The electrode terminal 113b is fixed with the cap plate 113a by welding, riveting or the like. The electrode terminal 113b is provided as two in number and the two electrode terminals 113b are respectively electrically connected with the first electrode plate 111a and the second electrode plate 111b.

In the electrode assembly 111, one of the first electrode plate 111a and the second electrode plate 111b is a positive electrode plate, the other one of the first electrode plate 111a and the second electrode plate 111b is a negative electrode plate, and the separator 111c is an insulator provided between the positive electrode plate and the negative electrode plate. For example, the first electrode plate 111a is the positive electrode plate, the first electrode plate 111a comprises a first current collector and a first active material layer coated on a surface of the first current collector; the first current collector may be an aluminum foil, the first active material layer comprises ternary material, lithium manganese oxide or lithium iron phosphate. The second electrode plate 111b is the negative electrode plate, and the second electrode plate 111b comprises a second current collector and a second active material layer coated on a surface of the second current collector; the second current collector may be copper foil, the second active material layer comprises graphite or silicon.

Figure 3:
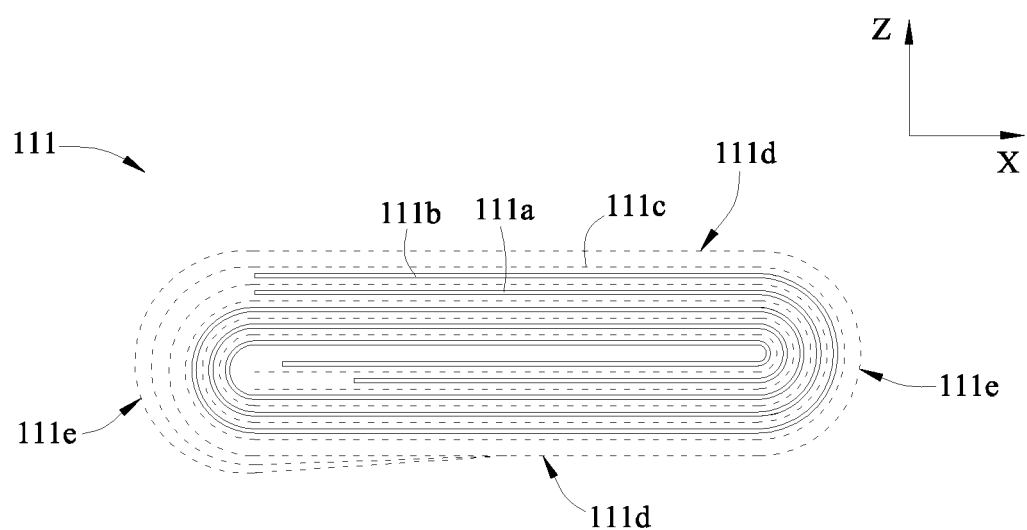
FIG. 3 is a cross sectional view of an electrode assembly of FIG. 2.

As shown in FIG. 3, in an embodiment, the electrode assembly 111 is a winding structure. Specifically, the first electrode plate 111a, the second electrode plate 111b and the separator 111c are belt-shaped structures. The first electrode plate 111a, the separator 111c and the second electrode plate 111b are stacked sequentially and wound to two or more turns to form the electrode assembly 111, and the electrode assembly 111 is in a flat shape. When preparing the electrode assembly 111, the electrode assembly 111 is wound to a hollow cylindrical structure, and then the electrode assembly 111 is pressed to a flat shape after winding. FIG. 3 is a schematic view showing a profile of the electrode assembly 111. The outer surface of the electrode assembly 111 comprises two flat surfaces 111d and two narrow surfaces 111e, the two flat surfaces 111d face each other in the vertical direction Z, the two narrow surfaces 111e face each other in the length direction X. The flat surface 111d is substantially parallel to a winding axis of the electrode assembly 111. The flat surface 111d is a relatively flat surface and not required to be an absolute plane. At least a part of the narrow surface 111e is in the shape of arc. The flat surface 111d is flat relative to the narrow surface 111e, and an area of the flat surface 111d is larger than an area of the narrow surface 111e.

Figure 4:
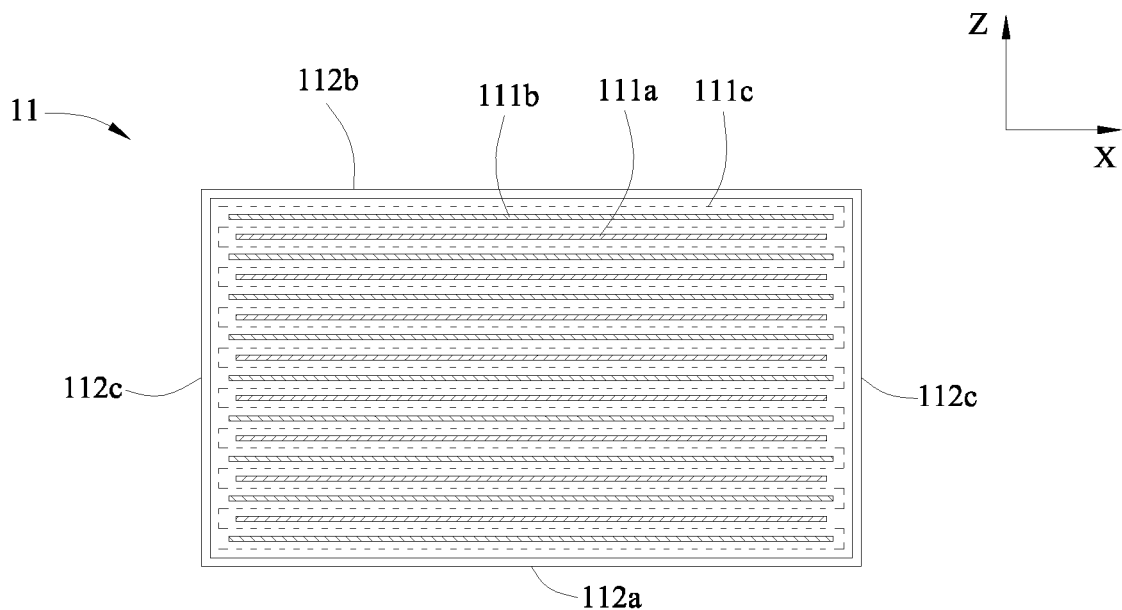
FIG. 4 is a schematic view of another embodiment of the first battery of the battery pack according to the present disclosure.

As shown in FIG. 4, in another embodiment, the electrode assembly 111 is a stacking structure. Specifically, the electrode assembly 111 comprises first electrode plates 111a and second electrode plates 111b; the separator 111c is provided between the first electrode plate 111a and the second electrode plate 111b. The first electrode plates 111a and the second electrode plates 111b are stacked in the vertical direction Z. In the stacking structure, the first electrode plate 111a and the second electrode plate 111b are in the shape of plate and substantially perpendicular to the vertical direction Z.

In the charge process or discharge process of the electrode assembly 111, the electrode plate will expand along its thickness direction. In the electrode assembly 111 having winding structure, an expanding force along a direction perpendicular to the flat surface 111 is largest; in the electrode assembly 111 having stacking structure, an expanding force along a stacking direction of the first electrode plates 111a and the second electrode plates 111b is largest. This shows that whether the electrode assembly 111 is a winding structure or a stacking structure, the largest expanding force applied to the case 112 by the electrode assembly 111 is along a direction substantially parallel to the vertical direction Z. In other words, in the horizontal direction, the electrode assembly 11 applies a smaller expanding force to the case 112. In the present disclosure, the first batteries 11 are arranged in the length direction X, so even though the expanding forces of all the electrode assemblies 111 in the length direction X are accumulated to form a composite force, and the composite force will not be excessive, thereby reducing a risk that the first batteries 11 is crushed.

The box assembly 2 has a connection portion, and the connection portion is positioned at a side of the battery module 1 in the vertical direction Z. An outer surface of the case 112 comprises a first surface 112a, and the first surface 112a is connected with the connection portion via the first adhesive member 3. The first surface 112a is positioned at an end of the case 112 close to the connection portion, and the first adhesive member 3 may be provided between the first surface 112a and the connection portion and connected with the first surface 112a and the connection portion. The first batteries 11 and the box assembly 2 are connected via the first adhesive member 3.

In an embodiment, a bottom wall of the lower box body 22 may act as the connection portion, the first adhesive member 3 is provided to the bottom wall of the lower box body 22; at this time, the first batteries 11 can be provided close to the bottom wall of the lower box body 22, the first surface 112a is connected with the bottom wall of the lower box body 22 via the first adhesive member 3.

In another embodiment, a top wall of the upper box cover 21 also can act as the connection portion, the first adhesive member 3 is provided to the top wall of the upper box cover 21; at this time, the first batteries 11 can be provided close to the top wall of the upper box cover 21, and the first surface 112a is connected with the top wall of the upper box cover 21 via the first adhesive member 3.

In still another embodiment, the box assembly 2 further comprises a fixing plate 23, and the fixing plate 23 also can act as the connection portion. The fixing plate 23 is accommodated in the accommodating cavity and positioned at an upper side of the battery module 1 in the vertical direction Z, and the fixing plate 23 is fixed with the upper box cover 21 via a fastener. The first adhesive member 3 is provided on the fixing plate 23, and the first surface 112a is connected with the fixing plate 23 via the first adhesive member 3. A gap is kept between the fixing plate 23 and the top wall of the upper box cover 21, and the gap can avoid deformation of the upper box cover 21 due to expansion of the first batteries 11 in the vertical direction Z.

In further another embodiment, referring to FIG. 1, the fixing plate 23 is accommodated in the accommodating cavity and positioned at a lower side of the battery module 1 in the vertical direction Z, and the fixing plate 23 can be fixed with the lower box body 22 via a fastener. The first adhesive member 3 is provided on the fixing plate 23, and the first surface 112a is connected with the fixing plate 23 via the first adhesive member 3. A gap is kept between the fixing plate 23 and the bottom wall of the lower box body 22, and the gap can avoid deformation of the lower box body 22 due to expansion of the first batteries 11 in the vertical direction Z.

The first adhesive member 3 is a solid adhesive, the adhesive is liquid or paste before solidification, the adhesive is coated between the connection portion and the first surface 112a of the first battery 11 and solidifies, thereby firmly connecting the first battery 11 and the box assembly 2. The adhesive is one or more selected from a group consisting of epoxy resin, polyurethane and acrylic resin.

In the present disclosure, the first batteries 11 are fixed to the box assembly 2 via the first adhesive member 3, thereby increasing the connecting strength between the battery module 1 and the box assembly 2, achieving the fixation of the first batteries 11, and reducing the safety risk when the battery pack vibrates.

Figure 8:
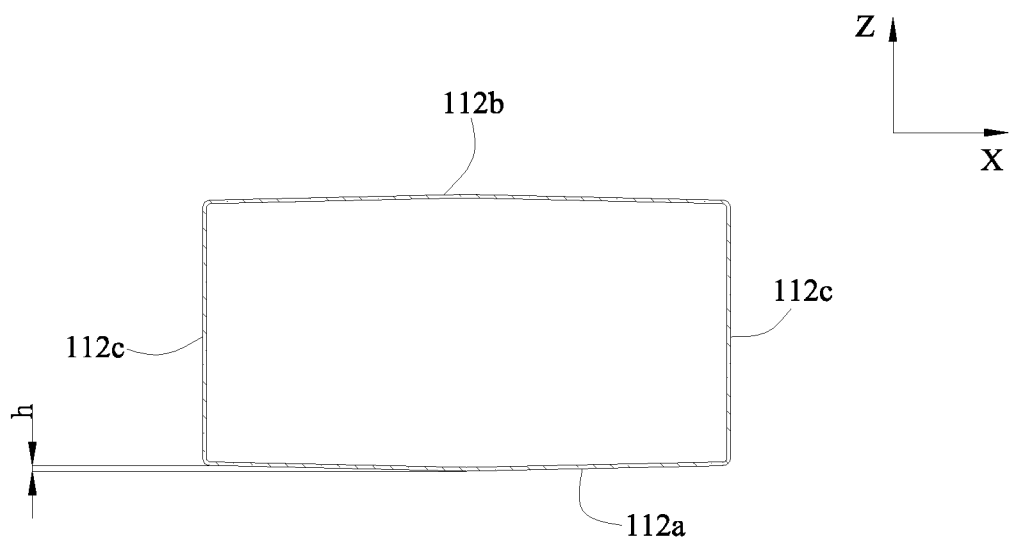
FIG. 8 is a schematic view of a case of FIG. 6.
Figure 9:
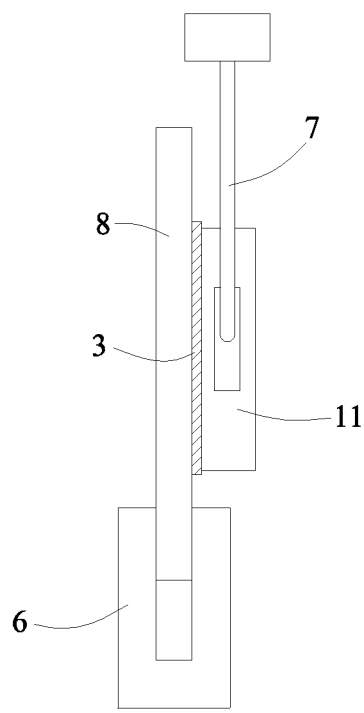
FIG. 9 is a schematic view of a battery in a test of shear strength.

In the charge process or discharge process of the electrode assembly 111, the electrode assembly 111 applies an expanding force to a circumferential wall of the case 112, and a first side wall of the case 112 corresponding to the first surface 112a is subjected to a largest expanding force and deforms most easily. Edge region of the first side wall corresponding to the first surface 112a is bound by other side walls, and an central region of the first side wall is subjected to a smaller bound force, so when the first side wall is subjected to the expanding force, the central region of the first side wall will bulge. Correspondingly, referring to FIG. 8, a height difference h will exist between the central region of the first surface 112a and the edge region of the first surface 112a.

An area of the first surface 112a is defined as A. The larger the value of A is, the smaller the bound force applied to the central region of the first side wall is, and the more the deformation of the central region of the first side wall is, that is, the larger the value of h is. The smaller the value of A is, the larger the bound force applied to the central region of the first side wall is, and the less the deformation of the central region of the first side wall is, that is, the smaller the value of h is.

When the electrode assembly 111 expands, the first side wall applies a reaction force to the electrode assembly 111. The larger the value of A is, the more the deformation of the first side wall is; the first side wall can release the expanding force by deformation, correspondingly, the reaction force applied to the electrode assembly 111 by the first side wall can be decreased. The smaller the value of A is, the less the deformation of the first side wall is, and the lower the capability of the first side wall to release the expanding force is; correspondingly, the first side wall will apply a larger reaction force to the electrode assembly 111. When the reaction force applied to the electrode assembly 111 is excessively large, an electrolyte between the first electrode plate 111a and the second electrode plate 111b is easily extruded out, which leads to the infiltration capability of partial region being reduced, the lithium-ion being unable to pass through the separator 111c and causes the lithium precipitation.

An elastic modulus of the first adhesive member 3 is defined as B. The larger the value of B is, the higher the stiffness of the first adhesive member 3 is, and the less easily the first adhesive member 3 deforms when it is subjected to force. The smaller the value of B is, the lower the stiffness of the first adhesive member 3 is, and the more easily the first adhesive member 3 deforms when it is subjected to force. In addition, to a certain extent, the value of B is directly proportional to the bonding strength of the first adhesive member 3.

Figure 6:
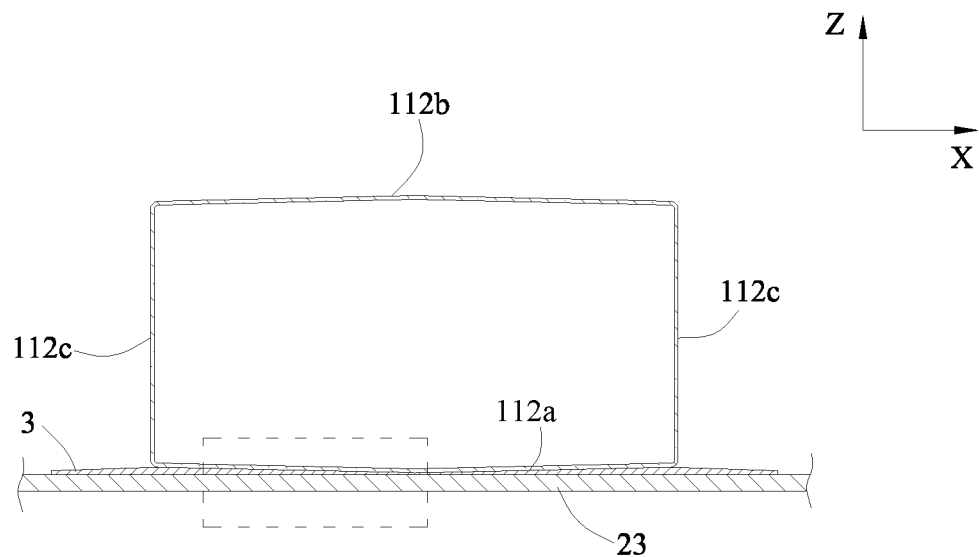
FIG. 6 is a schematic view of the battery pack according to the present disclosure after the first battery expands.
Figure 7:
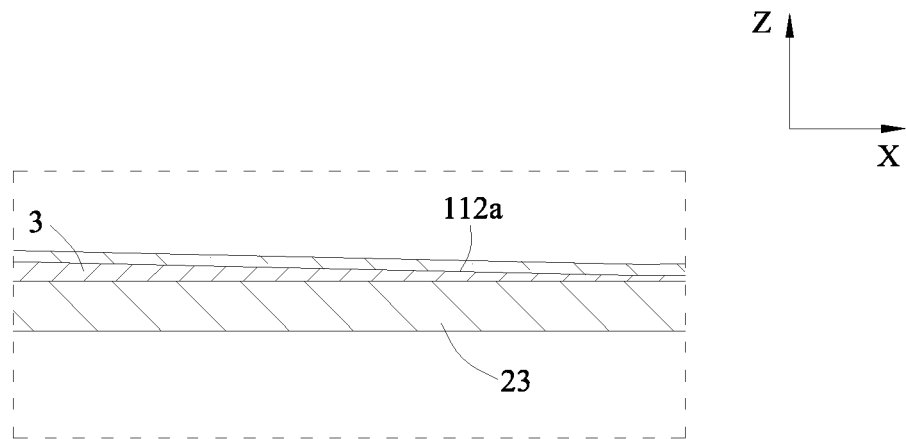
FIG. 7 is an enlarged view of a part of FIG. 6 within a dotted-line frame

When the electrode assembly 111 expands, the first side wall will deform under the influence of the expanding force. At the same time, referring to FIG. 6 and FIG. 7, the first surface 112a will also press the first adhesive member 3.

The larger the value of B is, the less easily the first adhesive member 3 deforms; the first adhesive member 3 is bonded with the first surface 112a, so the first adhesive member 3 will limit the deformation of the first surface 112a too. In other words, the larger the value of B is, the smaller the deformation of the first side wall is, the greater the reaction force applied to the electrode assembly 111 by the first side wall is, the more easily the electrolyte in the electrode assembly 111 is extruded out, and the higher a risk of lithium precipitation is.

The smaller the value of B is, the more easily the first adhesive member 3 deforms; in other words, the smaller the value of B is, the more the deformation of the first side wall is, the less the reaction force applied to the electrode assembly 111 by the first side wall is, and the lower a risk that the electrolyte is extruded out is. However, the easier the first surface 112a deforms, the larger the height difference h between the central region and the edge region is; referring to FIG. 7 and FIG. 8, although a part of the first adhesive member 3 contacting the central region of the first surface 112a is pressed, a part of the first adhesive member 3 contacting the edge region of the first surface 112a is stretched easily. The smaller the value of B is, the lower the bonding strength of the first adhesive member 3 is; when the first adhesive member 3 is stretched, the first adhesive member 3 is easily separated from the first surface 112a or the connection portion, which leads to the connecting strength between the first battery 11 and the connection portion being lower, and results in a risk that the first battery 11 is detached from the box assembly 2.

In conclusion, the area A of the first surface 112a and the elastic modulus B of the first adhesive member 3 have an significant influence on the dynamics performance of the first battery 11 and the connecting strength between the first battery 11 and the box assembly 2. In the present disclosure, the area A of the first surface 112a and the elastic modulus B of the first adhesive member 3 are comprehensively considered, when "0.02 cm$^2$/MPa≤A/B≤9 cm$^2$/MPa" is satisfied, it can ensure the dynamics performance of the first battery 11 and the connecting strength between the first battery 11 and the box assembly 2.

Specifically, if "A/B≤0.02 cm$^2$/MPa", the value of A is smaller and the value of B is larger. When the electrode assembly 111 of the first battery 11 expands, because the value of A is smaller, the deformation capability of the first side wall is limited; and because the value of B is larger, the first adhesive member 3 will further limit the deformation of the first side wall. At this time, the deformation of the first side wall is limited, so the first side wall will apply a larger reaction force to the electrode assembly 111, the electrolyte in the electrode assembly 111 will be extruded out, which leads to the infiltration capability of partial region being reduced, the lithium-ion being unable to pass through the separator 111c and causes the lithium precipitation.

If "A/B>9 cm$^2$/MPa", the value of A is larger and the value of B is smaller. When the electrode assembly 111 of the first battery 11 expands, because the value of A is larger, the deformation of the first side wall is also more; correspondingly, the first surface 112a is easier to deform, and the height difference h between the central region of the first surface 112a and the edge region of first surface 112a is also larger. Because the value of B is smaller, the first adhesive member 3 cannot effectively limit the deformation of the first surface 112a, which leads to the height difference h between the central region of the first surface 112a and the edge region of first surface 112a being excessive large, and a part of the first adhesive member 3 contacting the edge region of the first surface 112a being stretched more easily. When the first adhesive member 3 is stretched, the first adhesive member 3 is more easily separated from the first surface 112a or the connection portion, which leads to the connecting strength between the first battery 11 and the connection portion being lower, and results in a risk that the first battery 11 is detached from the box assembly 2.

Preferably, the area A of the first surface 112a and the elastic modulus B of the first adhesive member 3 satisfy a relationship: 0.06 cm$^2$/MPa≤A/B≤4 cm$^2$/MPa.

The area A of the first surface 112a is 20 cm$^2$-900 cm$^2$, preferably 50 cm$^2$-600 cm$^2$. The elastic modulus B of the first adhesive member 3 is 100 Mpa-1000 Mpa, preferably 150 MPa-800 MPa.

A thickness of the first adhesive member 3 is defined as C. When the electrode assembly 111 of the first battery 11 expands, the part of the first adhesive member 3 contacting the edge region of the first surface 112a is stretched easily. The larger the value of C is, the greater a length of the first adhesive member 3 capable of being stretched before the first adhesive member 3 is separated from the first surface 111a or the connection portion is; otherwise, the smaller the value of C is, and the less the length of the first adhesive member 3 capable of being stretched is. In addition, the smaller the value of B is, the more easily the first adhesive member 3 is stretched.

When the electrode assembly 111 of the first battery 11 expands, if the value of B is smaller and the value of A is larger, the first surface 112a is easier to deform, the height difference h between the central region of the first surface 112a and the edge region of the first surface 112a is larger. At this time, the part of the first adhesive member 3 contacting the edge region of the first surface 112a needs to be stretched to a larger length, to avoid the first adhesive member 3 being separated from the first surface 112 or the connection portion. Therefore, the thickness C of the first adhesive member 3 needs to have a larger value.

When the electrode assembly 111 of the first battery 11 expands, if the value of B is larger and the value of A is smaller, the first surface 112a is less easy to deform, the height difference h between the central region of the first surface 112a and the edge region of the first surface 112a is smaller. At this time, the part of the first adhesive member 3 contacting the edge region of the first surface 112a will be stretched to a smaller length. Therefore, the thickness C of the first adhesive member 3 can has a smaller value, to decease the usage amount of the adhesive, reduce cost and improve energy density.

In conclusion, the elastic modulus B of the first adhesive member 3 and the thickness C of the first adhesive member 3 have an significant influence on the connecting strength between the first battery 11 and the box assembly 2. In the present disclosure, the elastic modulus B of the first adhesive member 3 and the thickness C of the first adhesive member 3 are comprehensively considered, when a relationship, 2 MPa·cm≤B·C≤500 MPa·cm, is satisfied, it can ensure the connecting strength between the first battery 11 and the box assembly 2.

If "B·C<2 MPa·cm", both the value of B and the value of C are smaller, the first adhesive member 3 is easily separated from the first surface 112 or the connection portion. If "B·C>500 MPa·cm", the value of C is larger, which results in waste of the adhesive, more inner space of the box assembly 2 being occupied.

The thickness C of the first adhesive member 3 is 0.02 cm-1 cm, preferably 0.05 cm-0.5 cm.

A roughness of the first surface 112a is 0.01 μm-2 μm. If the roughness of the first surface 112a is smaller than 0.01 μm, the first surface 112a is excessively smooth, which is not beneficial for bonding the first surface 112a and the first adhesive member 3, and reduces the connecting strength between the first surface 112a and the connection portion.

The case 112 is substantially in a shape of hexahedron. Specifically, referring to FIG. 2 and FIG. 5, the case 112 further comprises a second surface 112b, two third surfaces 112c and a fourth surface 112d. The second surface 112b is positioned at an end of the case 112 away from the connection portion in the vertical direction Z, the second surface 112b and the first surface 112a face each other in the vertical direction Z. The two third surfaces 112c are respectively positioned at two ends of the case 112 in the length direction X and face each other in the length direction X. The fourth surface 112d is positioned at and end of the case 112 in the width direction Y.

Before the electrode assembly 111 expands, the first surface 112a and the second surface 112b are substantially planar surfaces perpendicular to the vertical direction Z, the two third surfaces 112c are substantially planar surfaces perpendicular to the length direction X, the fourth surface 112d is substantially planar surface perpendicular to the width direction Y. The first surface 112a, the third surface 112c and the fourth surface 112d are connected with each other via transition surfaces in the shape of arc. The second surface 112b, the third surface 112c and the fourth surface 112d are connected with each other via transition surfaces in the shape of arc.

Both of the area of the first surface 112a and an area of the second surface 112b are larger than an area of the third surface 112c. The electrode assembly 111 generates gas in the charge process or discharge process, and the gas will apply a force to the case 112, thereby intensifying outward expansion of the case 112. In an embodiment, both of the area of the first surface 112a and the area of the second surface 112b are larger than the area of the third surface 112c, and the first surface 112a and the second surface 112b face each other in the vertical direction Z, so a direction of a largest force applied to the case 112 by the gas is along the vertical direction Z. Compared to known technology, it can further decrease the largest expanding force of the battery module 1.

A contacting area between the first adhesive member 3 and the first surface 112a is defined as S1, a total area of the outer surface of the case 112 is defined as S2, a value of S1/S2 is larger than 6%. The total area of the outer surface of the case 112 is a sum of the area of the first surface 111a, the area of the second surface 111b, the areas of the two third surfaces 111c, an area of the fourth surface 111d and areas of the transition surfaces in the shape of arc.

The larger a value of S1 is, the greater a bonding force between the first adhesive member 3 and the first battery 11 is; otherwise, the smaller the value of S1 is, the less the bonding force between the first adhesive member 3 and the first battery 11 is. The larger a value of S2 is, the larger a volume of the first battery 11 is, the larger a weight of the first battery 11 is, and the greater the bonding force the first battery 11 needs to have is; otherwise, the smaller the value of S2 is, the less the bonding force the first battery 11 needs to have is. In the present disclosure, the value of S1 and the value of S2 are comprehensively considered, when the value of S1/S2 is larger than 6%, it can ensure the connecting strength between the first adhesive member 3 and the first battery 11.

The battery module 1 further comprises second batteries 12 arranged sequentially in the horizontal direction, the second battery 12 and the first battery 11 are stacked in the vertical direction Z, and the second battery 12 is positioned at a side of the first battery 11 close to the second surface 112b. The second battery 12 and the first battery 11 are the same battery.

A dimension of the battery module 1 in the horizontal direction is larger than a dimension of the battery module 1 in the vertical direction Z. In the present disclosure, it can reduce a number of layers of the batteries stacked in the vertical direction Z, so as to decrease the largest expanding force of the battery module 1, and avoid the batteries being crushed. In addition, a height dimension of a chassis of the vehicle body is limited, so the battery module 1 preferably has a smaller dimension in the vertical direction Z.

Referring to FIG. 1, the battery pack further comprises a second adhesive member 4, and the second adhesive member 4 connects the second surface 112b and the second battery 12. The second adhesive member 4 is provided between the second surface 112b and the second battery 12, and bonds the first battery 11 and the second battery 12 together. The second adhesive member 4 is an adhesive.

An area of the second surface 112b is defined as D, and an elastic modulus of the second adhesive member 4 is defined as E. In the present disclosure, the area D of the second surface 112b is substantially same as the area A of the first surface 112a. The second adhesive member 4 and the first adhesive member 3 can use the same adhesive, the elastic modulus E of the second adhesive member 4 is substantially same as the elastic modulus B of the first adhesive member 3. Preferably, $0.02 \text{ cm}^2/\text{MPa} \leq D/E \leq 9 \text{ cm}^2/\text{MPa}$.

Figure 5:
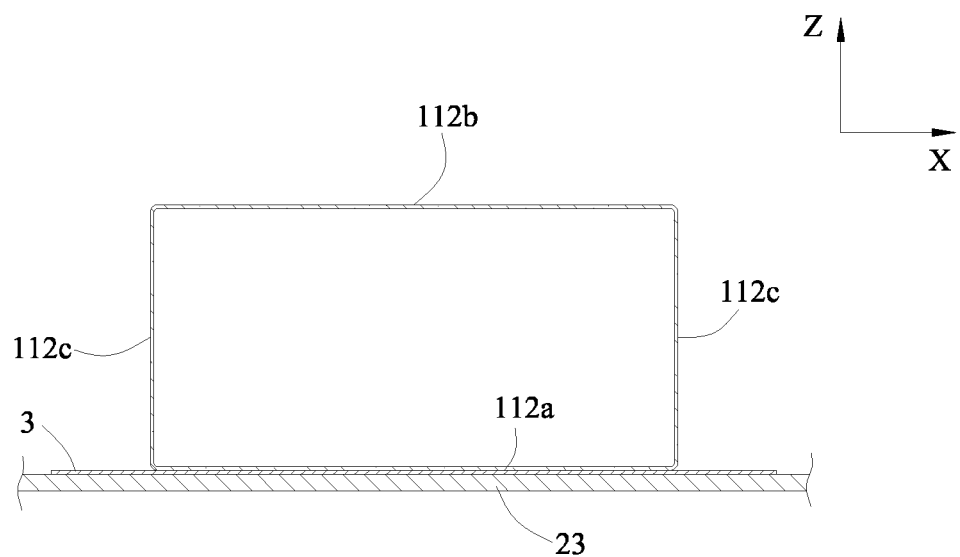
FIG. 5 is a schematic view of the battery pack according to the present disclosure before the first battery expands.

Referring to FIG. 1 and FIG. 5, the battery pack further comprises a third adhesive member 5, the third adhesive member 5 bonds the third surfaces 112c of two adjacent first batteries 11. A connecting area between the third adhesive member 5 and the third surface 112c is defined as S3, an area of the third surface 112c is defined as S4, and the value of S3/S4 is 0.25-0.8. If the value of S3/S4 is smaller than 0.25, the connecting strength between the third adhesive member 5 and the third surface 112c will be poor; on the premise that the connecting strength is satisfied, it can decrease the value of S3 and save adhesive; therefore, the value of S3/S4 is preferably smaller than 0.8.

Hereinafter the present disclosure will be further described in detail in combination with the examples.

A battery pack of an example 1 could be prepared according to the following steps:

(i) NCM523 (positive active material), acetylene black (conductive agent) and PVDF (binder) according to a mass ratio of 96:2:2 were uniformly mixed with NMP (solvent), which then became homogeneous under stirring via a vacuum mixer, a positive slurry was obtained; then the positive slurry was uniformly coated on an aluminum foil, drying was then performed under room temperature and continual drying was performed in an oven, which was then followed by cold pressing, slitting and plate cutting, finally the positive electrode plate was obtained.

(ii) Graphite or a mixer of graphite and other active materials with a certain mass ratio (negative active material), acetylene black (conductive agent), CMC (thickening agent) and SBR (binder) according to a mass ratio of 96.4:1:1.2:1.4 were uniformly mixed with deionized water (solvent), which then became homogeneous under stirring via a vacuum mixer, a negative slurry was obtained; then the negative slurry was uniformly coated on a copper foil, drying was then performed under room temperature and continual drying was performed in an oven, which was then followed by cold pressing, slitting and plate cutting, finally the negative electrode plate was obtained.

(iii) Ethylene carbonate (EC), ethyl methyl carbonate (EMC) and diethyl carbonate (DEC) according to a volume ratio of 1:1:1 were mixed together to obtain an organic solvent, then sufficiently dried $LiPF_6$ (lithium salt) was dissolved into the mixed organic solvent to obtain an electrolyte, and a concentration of the electrolyte was 1 mol/L.

(iv) The separator was a polyethylene membrane.

(v) The first electrode plate 111a, the separator 111c and the second electrode plate 111b were stacked sequentially and wound to turns, which then was pressed to a flat shape to form an electrode assembly 111. The electrode assembly 111 had two flat surfaces 111d.

(vi) The electrode assembly 111 and a cap assembly 113 were connected, then the electrode assembly 111 was placed into the case 112, and a cap plate 113a of the cap assembly 113 was welded with the case 112; finally, after electrolyte injection, standby, formation, shaping and the like, a battery was obtained. An area A of a first surface 111a of the case 112 parallel to a flat surface 111d of the electrode assembly 111 was 300 $cm^2$.

(vii) A layer of adhesive was coated on a metal plate 8, and then the first surface 111a of the case 112 was bonded to the adhesive.

(viii) A first adhesive member 3 was formed after curing the adhesive, and an elastic modulus B of the first adhesive member 3 was 100 Mpa, a thickness C of the first adhesive member 3 was 0.2 cm.

In addition, it could adjust the thickness C of the first adhesive member 3 by changing the coated thickness of the adhesive in step (vii), and it could adjust the elastic modulus B of the first adhesive member 3 by changing the component of the adhesive. After step (viii), it could cut a part of the first adhesive member 3, and measure the elastic modulus B of the first adhesive member 3 by using a DMA-Q800 detector. A thickness of the battery in a direction perpendicular to the first surface 111a was 5 cm.

Battery packs of examples 2-35 and battery packs of comparative examples 1-5 all could be prepared in accordance with the preparing method of the battery pack of the example 1. The differences among the battery packs of the examples 1-35 and the battery packs of comparative examples 1-5 were the area A of the first surface 111a, the elastic modulus B of the first adhesive member 3 and the thickness C of the first adhesive member 3. Specific parameters were shown in the table 1.

Hereinafter test processes of the battery packs prepared in the examples 1-35 and the comparative examples 1-5 were described.

Test of Shear Strength.

At 25° C., the batteries prepared in the examples 1-35 and the comparative examples 1-5 were charged at a constant current of 3 C and discharged at a constant current of 1 C for 2000 cycles. After 2000 cycles of charge and discharge, the metal plate 8 was fixed to a jig 6 of a shear testing machine, and the battery was clamped by a detector 7; then the detector 7 moved the battery at a speed of 5 mm/min along a direction parallel to the first adhesive member 3, and the detector 7 would automatically generate values of pull forces and record a value F of pull force when the metal plate 8 was separated from the battery. The value of F/A was a shear strength. When the value of F/A was larger than 2 MPa, it could satisfy battery's requirement of shear strength. The shear testing machine might be a microcomputer control electronic universal testing machine (type: MTS-CMT 6502 or MTS-CMT 4104-BZ).

Test of Dynamics Performance.

At 25° C., the batteries prepared in the examples 1-35 and the comparative examples 1-5 were charged at a constant current of 3 C and discharged at a constant current of 1 C for 2000 cycles. After 2000 cycles of charge and discharge, the second electrode plate 111b was disassembled from the battery, and the lithium precipitation of the second electrode plate was observed. A ratio of the lithium-precipitation area of the second electrode plate 111b to the total area of the second electrode plate 111b less than 5% was considered to be slight lithium precipitation, a ratio of the lithium-precipitation area of the second electrode plate 111b to the total area of the second electrode plate 111b between 5%-40% was considered to be moderate lithium precipitation, a ratio of the lithium-precipitation area of the second electrode plate 111b to the total area of the second electrode plate 111b more than 40% was considered to be serious lithium precipitation.

In order to avoid the test of shear strength and the test of dynamics performance influencing each other, each example was provided as ten sets; five sets of each example were used for testing the shear strength, and the values of F/A obtained in the five sets were averaged; the other five sets of each example were used for testing dynamics performance, and the ratios obtained in the other five sets were averaged.

Referring to the examples 1-35 and the comparative examples 1-2, when the value of A/B was smaller than 0.02 $cm^2$/MPa, the case 112 would apply a larger reaction force to the electrode assembly 111, the electrolyte in the electrode assembly 111 would be extruded out, which lead to the infiltration capability of partial region being reduced, the lithium-ion being unable to pass through the separator 111c and caused a larger lithium precipitation area of the second electrode plate 111b. When the value of A/B was larger than or equal to 0.02 $cm^2$/MPa, it could effectively decrease the reaction force applied to the electrode assembly 111, and promote the infiltration capability of the electrode assembly 111 and reduce the lithium precipitation area of the second electrode plate 111b.

Referring to the examples 1-35 and the comparative examples 3-5, when the value of A/B was larger than 9 $cm^2$/MPa, the shear strength between the battery and the metal plate 8 was smaller than 2 MPa, which could not satisfy the battery's requirement of shear strength. In an actual battery pack, if the shear strength between the battery and the box assembly 2 was smaller than 2 MPa, when the battery pack vibrated, the battery was easily separated from the box assembly 2. When the value of A/B was smaller than or equal to 9 $cm^2$/MPa, the shear strength between the battery and the metal plate 8 was larger than 2 MPa, which satisfied the battery's requirement of shear strength.

According to the examples 1-35 and the comparative examples 1-5, when "0.02 $cm^2$/MPa≤A/B≤9 $cm^2$/MPa", it could ensure the dynamics performance of the battery and the connecting strength between the battery and the box assembly 2 at the same time.

Referring to the examples 1-10, when the value of area A of the first surface 111a and the value of thickness C of the first adhesive member 3 were constant, by changing the elastic modulus B of the first adhesive member 3, it could adjust the shear strength between the battery and the metal plate 8. According to the examples 1-10, when the value of area A and the value of thickness C were constant, the value of B was substantially directly proportional to the shear strength (the value of F/A).

Referring to the example 5 and the examples 11-19, when the value of the elastic modulus B of the first adhesive member 3 and the value of the thickness C of the first adhesive member 3 were constant, by changing the area A of the first surface 111a, it could adjust the shear strength between the battery and the metal plate 8. According to example 5 and examples 11-19, when the value of the elastic modulus B and the value of thickness C were constant, the value of A was substantially inversely proportional to the shear strength (the value of F/A).

Referring to the example 5 and the examples 26-30, when the value of area A of the first surface 111a and the value of the elastic modulus B of the first adhesive member 3 were constant, by changing the thickness C of the first adhesive member 3, it could adjust the shear strength between the battery and the metal plate 8. According to the example 5 and the examples 26-30, when the value of the area A and the value of the elastic modulus B were constant, the value of C was substantially directly proportional to the shear strength (the value of F/A).

Referring to the comparative examples 4-5, when the value of AB was larger than 9 cm²/MPa, the shear strength between the battery and metal plate 8 was insufficient. However, according to the comparative examples 4-5, by increasing the value of C, it might improve the shear strength between the battery and the metal plate 8.

TABLE 1

Parameters and test results of examples 1-35 and comparative examples 1-5

| | A (cm²) | B (Mpa) | C (cm) | F (KN) | A/B (cm²/MPa) | B · C (MPa · cm) | F/A (MPa) | Dynamics performance |
|---|---|---|---|---|---|---|---|---|
| Example 1 | 300 | 100 | 0.2 | 226 | 3 | 20 | 7.5 | Slight lithium precipitation |
| Example 2 | 300 | 200 | 0.2 | 251 | 1.5 | 40 | 8.3 | Slight lithium precipitation |
| Example 3 | 300 | 300 | 0.2 | 276 | 1 | 60 | 9.2 | Slight lithium precipitation |
| Example 4 | 300 | 400 | 0.2 | 316 | 0.75 | 80 | 10.5 | Slight lithium precipitation |
| Example 5 | 300 | 500 | 0.2 | 363 | 0.6 | 100 | 12.1 | Slight lithium precipitation |
| Example 6 | 300 | 600 | 0.2 | 415 | 0.5 | 120 | 13.8 | Slight lithium precipitation |
| Example 7 | 300 | 700 | 0.2 | 464 | 0.43 | 140 | 15.4 | Slight lithium precipitation |
| Example 8 | 300 | 800 | 0.2 | 490 | 0.38 | 160 | 16.3 | Slight lithium precipitation |
| Example 9 | 300 | 900 | 0.2 | 515 | 0.33 | 180 | 17.1 | Slight lithium precipitation |
| Example 10 | 300 | 1000 | 0.2 | 535 | 0.3 | 200 | 17.8 | Slight lithium precipitation |
| Example 11 | 50 | 500 | 0.2 | 168 | 0.1 | 100 | 33.6 | Slight lithium precipitation |
| Example 12 | 100 | 500 | 0.2 | 243 | 0.2 | 100 | 24.3 | Slight lithium precipitation |
| Example 13 | 200 | 500 | 0.2 | 312 | 0.4 | 100 | 15.6 | Slight lithium precipitation |
| Example 14 | 400 | 500 | 0.2 | 412 | 0.8 | 100 | 10.3 | Slight lithium precipitation |
| Example 15 | 500 | 500 | 0.2 | 445 | 1 | 100 | 8.9 | Slight lithium precipitation |
| Example 16 | 600 | 500 | 0.2 | 486 | 1.2 | 100 | 8.1 | Slight lithium precipitation |
| Example 17 | 700 | 500 | 0.2 | 525 | 1.4 | 100 | 7.5 | Slight lithium precipitation |
| Example 18 | 800 | 500 | 0.2 | 552 | 1.6 | 100 | 6.9 | Slight lithium precipitation |
| Example 19 | 900 | 500 | 0.2 | 594 | 1.8 | 100 | 6.6 | Slight lithium precipitation |
| Example 20 | 20 | 1000 | 0.2 | 90.4 | 0.02 | 200 | 45.2 | Slight lithium precipitation |
| Example 21 | 100 | 1000 | 0.2 | 314 | 0.1 | 200 | 31.4 | Slight lithium precipitation |
| Example 22 | 200 | 1000 | 0.2 | 442 | 0.2 | 200 | 22.1 | Slight lithium precipitation |
| Example 23 | 900 | 100 | 0.2 | 189 | 9 | 20 | 2.1 | Slight lithium precipitation |
| Example 24 | 900 | 200 | 0.2 | 333 | 4.5 | 40 | 3.7 | Slight lithium precipitation |
| Example 25 | 900 | 300 | 0.2 | 459 | 3 | 60 | 5.1 | Slight lithium precipitation |
| Example 26 | 300 | 500 | 0.02 | 246 | 0.6 | 10 | 8.2 | Slight lithium precipitation |
| Example 27 | 300 | 500 | 0.1 | 301 | 0.6 | 50 | 10.0 | Slight lithium precipitation |
| Example 28 | 300 | 500 | 0.3 | 441 | 0.6 | 150 | 14.7 | Slight lithium precipitation |
| Example 29 | 300 | 500 | 0.4 | 492 | 0.6 | 200 | 16.4 | Slight lithium precipitation |
| Example 30 | 300 | 500 | 0.5 | 525 | 0.6 | 300 | 17.5 | Slight lithium precipitation |
| Example 31 | 300 | 1000 | 0.5 | 582 | 0.3 | 500 | 19.4 | Slight lithium precipitation |

TABLE 1-continued

Parameters and test results of examples 1-35 and comparative examples 1-5

| | A (cm²) | B (Mpa) | C (cm) | F (KN) | A/B (cm²/MPa) | B·C (MPa·cm) | F/A (MPa) | Dynamics performance |
|---|---|---|---|---|---|---|---|---|
| Example 32 | 300 | 800 | 0.5 | 561 | 0.38 | 400 | 18.7 | Slight lithium precipitation |
| Example 33 | 300 | 100 | 0.02 | 183 | 3 | 2 | 6.1 | Slight lithium precipitation |
| Example 34 | 300 | 200 | 0.02 | 201 | 1.5 | 4 | 6.7 | Slight lithium precipitation |
| Example 35 | 300 | 300 | 0.02 | 225 | 1 | 6 | 7.5 | Slight lithium precipitation |
| Comparative example 1 | 10 | 1000 | 0.2 | 62.9 | 0.01 | 200 | 62.9 | Serious lithium precipitation |
| Comparative example 2 | 10 | 800 | 0.2 | 54.6 | 0.013 | 160 | 54.6 | Moderate lithium precipitation |
| Comparative example 3 | 900 | 50 | 0.2 | 63 | 45 | 10 | 0.7 | Slight lithium precipitation |
| Comparative example 4 | 500 | 50 | 0.2 | 70 | 10 | 10 | 1.4 | Slight lithium precipitation |
| Comparative example 5 | 500 | 50 | 1 | 80 | 10 | 50 | 1.6 | Slight lithium precipitation |

Furthermore, the embodiments of the present disclosure further provide an apparatus, which includes a battery pack according to any one of the embodiments as described above, wherein the battery pack is adapted to provide power for the apparatus. The apparatus may be an electric vehicle, a hybrid vehicle, an electric scooter, an electric cart or any other suitable devices which can include the battery pack as their own power source.

What is claimed is:

1. A battery pack, comprising a battery module, a box assembly and a first adhesive member;
the box assembly having an accommodating cavity, the battery module being positioned in the accommodating cavity of the box assembly;
the battery module comprising first batteries arranged sequentially in a horizontal direction;
the first battery comprising an electrode assembly and a case, and the electrode assembly being received in the case;
the electrode assembly comprising a first electrode plate, a second electrode plate and a separator provided between the first electrode plate and the second electrode plate;
the electrode assembly being a winding structure and in a flat shape, and the electrode assembly comprising two flat surfaces, the two flat surfaces facing each other in a vertical direction; or, the electrode assembly being a stacking structure, the first electrode plate, the separator and the second electrode plate being stacked in the vertical direction;
the box assembly having a connection portion, and the connection portion being positioned at a side of the battery module in the vertical direction;
an outer surface of the case comprising a first surface, and the first surface being connected with the connection portion via the first adhesive member;
an area A of the first surface and an elastic modulus B of the first adhesive member satisfying a relationship:

$$0.06 \text{ cm}^2/\text{MPa} \leq A/B \leq 4 \text{ cm}^2/\text{MPa}.$$

2. A battery pack, comprising a battery module, a box assembly and a first adhesive member;
the box assembly having an accommodating cavity, the battery module being positioned in the accommodating cavity of the box assembly;
the battery module comprising first batteries arranged sequentially in a horizontal direction;
the first battery comprising an electrode assembly and a case, and the electrode assembly being received in the case;
the electrode assembly comprising a first electrode plate, a second electrode plate and a separator provided between the first electrode plate and the second electrode plate;
the electrode assembly being a winding structure and in a flat shape, and the electrode assembly comprising two flat surfaces, the two flat surfaces facing each other in a vertical direction; or, the electrode assembly being a stacking structure, the first electrode plate, the separator and the second electrode plate being stacked in the vertical direction;
the box assembly having a connection portion, and the connection portion being positioned at a side of the battery module in the vertical direction;
an outer surface of the case comprising a first surface, and the first surface being connected with the connection portion via the first adhesive member;
an area A of the first surface and an elastic modulus B of the first adhesive member satisfying a relationship:

$$0.02 \text{ cm}^2/\text{MPa} \leq A/B \leq 9 \text{ cm}^2/\text{MPa},$$

the area A of the first surface is 50 cm²-600 cm²;
the elastic modulus B of the first adhesive member is 150 MPa-800 MPa.

3. The battery pack according to claim 1, wherein the area A of the first surface is 50 cm²-600 cm²;
the elastic modulus B of the first adhesive member is 150 MPa-800 MPa.

4. The battery pack according to claim 1, wherein the elastic modulus B of the first adhesive member and a thickness C of the first adhesive member satisfy a relationship:

$$2 \text{ MPa·cm} \leq B \cdot C \leq 500 \text{ MPa·cm}.$$

5. The battery pack according to claim 4, wherein the thickness C of the first adhesive member is 0.05 cm-0.5 cm.

6. The battery pack according to claim 1, wherein the elastic modulus B of the first adhesive member and a thickness C of the first adhesive member satisfy a relationship:

$$2\ \mathrm{MPa\cdot cm} \leq B\cdot C \leq 500\ \mathrm{MPa\cdot cm}.$$

7. The battery pack according to claim 1, wherein the first adhesive member is an adhesive, and the adhesive is one or more selected from a group consisting of epoxy resin, polyurethane and acrylic resin.

8. The battery pack according to claim 1, wherein the first adhesive member is an adhesive, and the adhesive is one or more selected from a group consisting of epoxy resin, polyurethane and acrylic resin.

9. The battery pack according to claim 1, wherein a dimension of the battery module in the horizontal direction is larger than a dimension of the battery module in the vertical direction.

10. The battery pack according to claim 1, wherein a contacting area between the first adhesive member and the first surface is defined as S1, a total area of the outer surface of the case is defined as S2, a value of S1/S2 is larger than 6%.

11. The battery pack according to claim 1, wherein the outer surface of the case further comprises a second surface and two third surfaces, the first surface and the second surface face each other in the vertical direction, and the two third surfaces face each other in the horizontal direction;
both of the area of the first surface and an area of the second surface are larger than an area of the third surface.

12. The battery pack according to claim 11, wherein the battery module further comprises second batteries arranged sequentially in the horizontal direction, the second battery and the first battery are stacked in the vertical direction, and the second battery is positioned at a side of the first battery close to the second surface;
the battery pack further comprises a second adhesive member, and the second adhesive member connects the second surface and the second battery.

13. The battery pack according to claim 1, wherein the case comprises an insulation layer and a base, the insulation layer is positioned at an outer side of the base and contacted with the first adhesive member.

14. The battery pack according to claim 1, wherein the box assembly comprises an upper box cover and a lower box body, the upper box cover and the lower box body are connected;
the connection portion is a bottom wall of the lower box body, the first adhesive member is provided to the bottom wall of the lower box body, and the first surface is connected with the bottom wall of the lower box body via the first adhesive member; or, the connection portion is a top wall of the upper box cover, the first adhesive member is provided to the top wall of the upper box cover, and the first surface is connected with the top wall of the upper box cover via the first adhesive member.

15. The battery pack according to claim 1, wherein the box assembly comprises an upper box cover, a lower box body and a fixing plate, the upper box cover and the lower box body are connected, the connection portion is the fixing plate;
the fixing plate is positioned at an upper side of the battery module in the vertical direction and connected with the upper box cover, the first adhesive member is provided on the fixing plate, and the first surface is connected with the fixing plate via the first adhesive member; or, the fixing plate is positioned at a lower side of the battery module in the vertical direction and connected with the lower box body, the first adhesive member is provided on the fixing plate, and the first surface is connected with the fixing plate via the first adhesive member.

16. A vehicle, comprising a vehicle body and a battery pack, the battery pack being positioned to the vehicle body;
the battery pack comprising a battery module, a box assembly and a first adhesive member;
the box assembly having an accommodating cavity, the battery module being positioned in the accommodating cavity of the box assembly;
the battery module comprising first batteries arranged sequentially in a horizontal direction;
the first battery comprising an electrode assembly and a case, and the electrode assembly being received in the case;
the electrode assembly comprising a first electrode plate, a second electrode plate and a separator provided between the first electrode plate and the second electrode plate;
the electrode assembly being a winding structure and in a flat shape, and the electrode assembly comprising two flat surfaces, the two flat surfaces facing each other in a vertical direction; or, the electrode assembly being a stacking structure, the first electrode plate, the separator and the second electrode plate being stacked in the vertical direction;
the box assembly having a connection portion, and the connection portion being positioned at a side of the battery module in the vertical direction;
an outer surface of the case comprising a first surface, and the first surface being connected with the connection portion via the first adhesive member;
an area A of the first surface and an elastic modulus B of the first adhesive member satisfying a relationship:

$$0.06\ \mathrm{cm^2/MPa} \leq A/B \leq 4\ \mathrm{cm^2/MPa}.$$

17. The vehicle according to claim 16, wherein the box assembly comprises an upper box cover and a lower box body, the upper box cover and the lower box body are connected;
the connection portion is a bottom wall of the lower box body, the first adhesive member is provided to the bottom wall of the lower box body, and the first surface is connected with the bottom wall of the lower box body via the first adhesive member; or, the connection portion is a top wall of the upper box cover, the first adhesive member is provided to the top wall of the upper box cover, and the first surface is connected with the top wall of the upper box cover via the first adhesive member.

18. The vehicle according to claim 16, wherein the box assembly comprises an upper box cover, a lower box body and a fixing plate, the upper box cover and the lower box body are connected, the connection portion is the fixing plate;
the fixing plate is positioned at an upper side of the battery module in the vertical direction and connected with the upper box cover, the first adhesive member is provided on the fixing plate, and the first surface is connected with the fixing plate via the first adhesive member; or, the fixing plate is positioned at a lower side of the battery module in the vertical direction and connected with the lower box body, the first adhesive member is provided on the fixing plate, and the first surface is connected with the fixing plate via the first adhesive member.

19. An apparatus, comprising a battery pack according to claim 1, wherein the battery pack is adapted to provide power for the apparatus.

* * * * *